United States Patent
Keese et al.

(10) Patent No.: US 7,624,649 B2
(45) Date of Patent: Dec. 1, 2009

(54) VORTEX FLOWMETER

(75) Inventors: Dieter Keese, Wahlsburg (DE); Harry Plotzki, Göttingen (DE); Frank Buhl, Rosdorf (DE); Karl-Heinz Rackebrandt, Adelebsen (DE); Andreas Thöne, Nörten-Hardenberg (DE); Jörg Herwig, Kandern (DE); Rolf Merte, Wiesloch (DE); Peter Riegler, Göttingen (DE)

(73) Assignee: ABB AG, Mannheim (DE)

( * ) Notice: Subject to any disclaimer, the term of this patent is extended or adjusted under 35 U.S.C. 154(b) by 0 days.

(21) Appl. No.: 11/662,960

(22) PCT Filed: Sep. 28, 2005

(86) PCT No.: PCT/EP2005/010466

§ 371 (c)(1),
(2), (4) Date: Feb. 13, 2008

(87) PCT Pub. No.: WO2006/034851

PCT Pub. Date: Apr. 6, 2006

(65) Prior Publication Data

US 2008/0314160 A1    Dec. 25, 2008

(30) Foreign Application Priority Data

Sep. 29, 2004    (DE) .................... 10 2004 047 242

(51) Int. Cl.
G01F 1/32    (2006.01)
(52) U.S. Cl. .................................. 73/861.22
(58) Field of Classification Search ........... 73/861.22, 73/861.23, 861.24
See application file for complete search history.

(56) References Cited

U.S. PATENT DOCUMENTS 4,437,349 A * 3/1984 Joy ..................... 73/861.22
4,455,877 A    6/1984 Blechinger et al.
4,630,484 A * 12/1986 Mizuno et al. ........... 73/861.22
6,276,218 B1 * 8/2001 Waers ................... 73/861.22

FOREIGN PATENT DOCUMENTS

DE    27 53 543         6/1978
DE    28 23 606  A1    12/1978
DE    30 36 186  C2     6/1981

OTHER PUBLICATIONS

International Preliminary Report on Patentability Dated Apr. 24, 2007.
International Search Report for PCT/EP2005/010466 dated Dec. 16, 2005.

* cited by examiner

*Primary Examiner*—Jewel Thompson
(74) *Attorney, Agent, or Firm*—Buchanan Ingersoll & Rooney PC

(57) ABSTRACT

A vortex flowmeter is disclosed, which includes, among other features, a closed measuring tube, through which a flowable medium that is to be quantitatively measured flows, the medium flowing against a disturbing element that is arranged in the measuring tube. A vibration sensor is arranged downstream in the direction of flow detecting the vortex frequency generated by the disturbing element. An electronic evaluation unit is disposed downstream of the vibration sensor converting it into an electric signal corresponding to the quantitative flow rate or volumetric flow rate. The relative position can be changed between the measuring tube and the disturbing element and/or the measuring tube and the vibration sensor in a signal-optimizing manner.

14 Claims, 1 Drawing Sheet

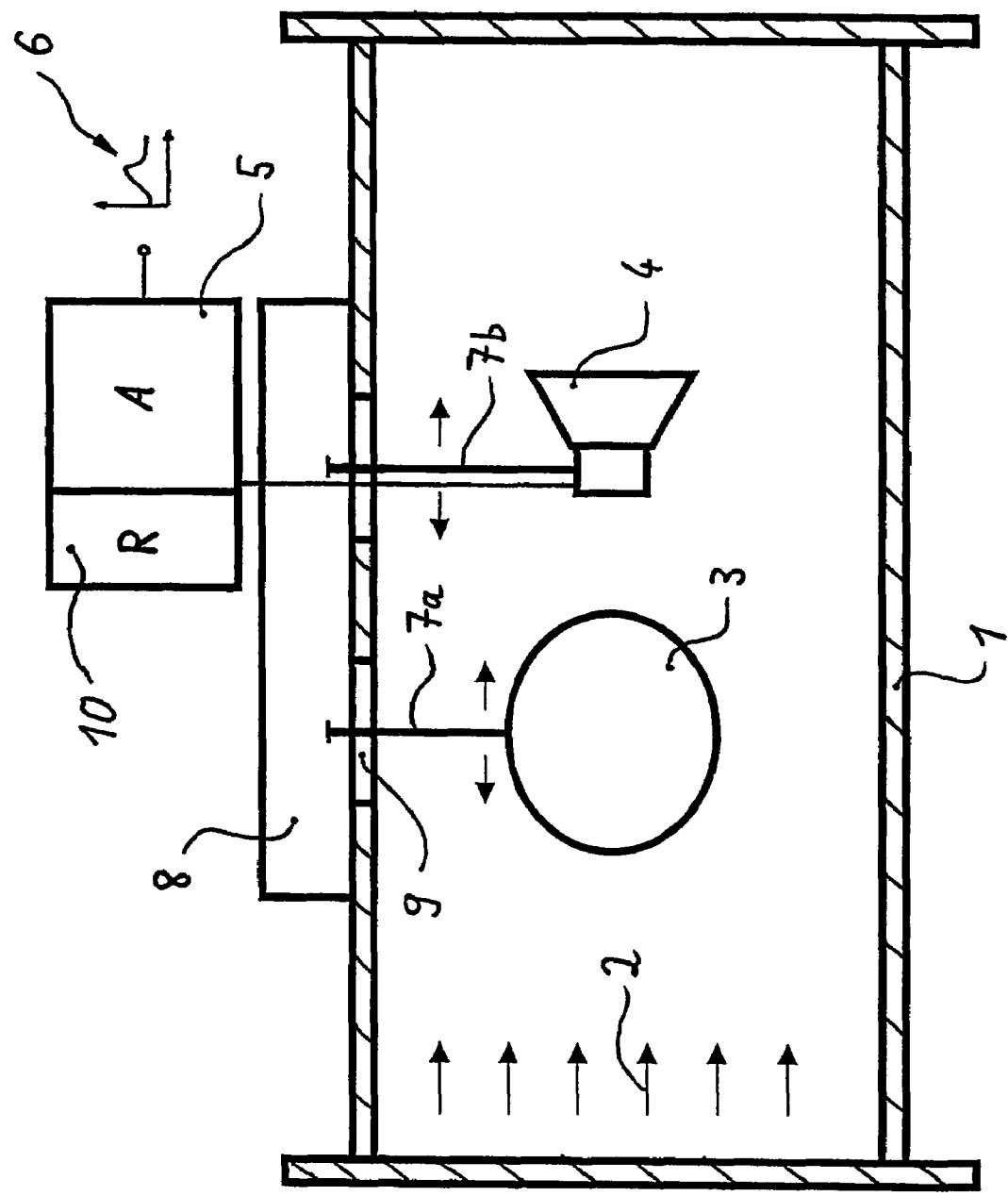

VORTEX FLOWMETER

The present invention relates to a vortex flowmeter comprising a closed measuring tube, through which a medium that is to be quantitatively measured flows, said medium flowing against a disturbing element that is arranged in said measuring tube, a vibration sensor that is arranged downstream in the direction of flow detecting the vortex frequency generated by the disturbing element and an electronic evaluation unit that is disposed downstream of the vibration sensor converting it into an electric signal corresponding to the quantitative flow rate or volumetric flow rate.

The field of use of such vortex flowmeters extends primarily to applications in the chemical industry, the pharmaceutical industry, the paper industry or the food industry, in order for example to permit a continuous measurement of the quantitative flow rate or volumetric flow rate in pipelines of the water/waste-water area of production installations.

Devices for measuring throughflow and quantity in closed pipelines of this type are subdivided into rate-of-flow meters (for example Coriolis mass flowmeters) and the quantity meters or volume meters of interest here (for example vortex flowmeters).

Vortex flowmeters have been generally known for many years and serve primarily for the quantitative measurement of liquids, gases and vapours as flowable media in closed pipelines. Vortex flowmeters operate on the physical principle of the Karman vortex street, in which the vortex frequency is measured downstream of a disturbing element exposed to the flow. This is because, if a flowing medium meets an obstacle, pressure variations form in the medium, leading to the shedding of vortices at the obstacle. This phenomenon is exploited by vortex flowmeters. The geometrically defined disturbing element causes vortex shedding to occur in the flowmeter, the frequency of which is detected by the downstream vibration sensor. In this case, the vibration sensors are usually positioned either at a fixed distance behind the disturbing element or directly on the disturbing element.

One problem with this flow measuring technique is due to the fact that the optimum positioning of the vibration sensor behind the disturbing element depends on the fluid-mechanical conditions, i.e. in particular the viscosity and Reynolds number of the medium. Consequently, the positioning of the vibration sensor is optimum only for a single fluid-mechanical configuration—for example water as the flowable medium. The positioning of the vibration sensor cannot be corrected to the new optimum if the fluid-mechanical configuration changes.

It is therefore the object of the present invention to improve the vortex flowmeter of the aforementioned type further to the extent that a flexible adaptation to different fluid-mechanical configurations is possible in a simple way.

The object is achieved on the basis of a vortex flowmeter according to the preamble of claim 1 in conjunction with its characterizing features. The dependent claims that follow present advantageous development of the invention.

The invention includes the technical teaching that, in the case of a vortex flowmeter, means for changing the relative position between the measuring tube and the disturbing element and/or the measuring tube and the vibration sensor in a signal-optimizing manner are provided.

The advantage of the solution according to the invention is, in particular, that it makes adaptive sensor positioning possible, in order for example to use a single vortex flowmeter for different flowable medium. The invention is based on the recognition that an optimum measuring signal can be produced either by changing the relative position between the measuring tube and the disturbing element or else by changing the relative position between the measuring tube and the vibration sensor, or both. This recognition offers various technical starting points for setting an optimum measuring signal—in particular a maximum amplitude—for different fluid-mechanical configurations. This is so since, either the disturbing element can be positionally changed in relation to the vibration sensor and the measuring tube or the vibration sensor can be positionally changed in relation to the measuring tube and the disturbing element. It is also conceivable to make both the vibration sensor and the disturbing element movable.

For this purpose, the means for changing the relative position in a signal-optimizing manner may act in a radial direction. In the case of one possible embodiment, the disturbing element or the vibration sensor may comprise a push rod, which is led through a corresponding wall opening in the measuring tube in a sealed manner, in order to perform a radial adjustment of the disturbing element or vibration sensor from the outside. Depending on the relative position of the disturbing element or vibration sensor in the measuring tube, the electric signal corresponding to the quantitative or volumetric flow rate changes. Therefore, the electric signal can be optimally set by changing the relative position in a radial direction.

In addition, it is also possible that the means for changing the relative position in a signal-optimizing manner act in an axial direction in relation to the measuring tube. In the case of one possible embodiment, a driver connected to the disturbing element or the vibration sensor may be provided for this, said driver being led through the measuring tube by means of a slide coupling in order to perform the axial adjustment of the disturbing element or vibration sensor from the outside. The driver is preferably of a two-part construction. A driver part that is arranged in the measuring tube and connected to the disturbing element or vibration sensor is connected here by means of a magnetic coupling to an exterior driver part. If the exterior driver part is then moved in an axial direction in relation to the measuring tube, the axial positioning of the disturbing element or vibration sensor coupled to it changes correspondingly. However, it is also conceivable to carry out the slide coupling through the measuring tube by means of a sealed longitudinal slit. In this case, however, suitable measures for sealing the slit, as are known from the area of hydraulics, have to be used.

Within the scope of the invention, it is also possible to adjust the relative position of the disturbing element or vibration sensor in the measuring tube equally in a radial direction and in an axial direction to obtain an optimum measuring signal or to adapt the measuring technique to different fluid-mechanical configurations.

According to one possible configurational variant, the signal-optimizing changing of the relative position in an axial direction and/or radial direction may be performed by means of manual actuating elements. Such manual actuating elements may be formed for example in the manner of adjusting screws and the like, which permit manual changing of the relative position.

According to a further configurational variant, the signal-optimizing changing of the relative position in an axial direction and/or radial direction may be performed by means of adjusting elements that can be moved by auxiliary energy. Suitable for this for example are electric linear drives, such as proportional magnets and the like.

If adjusting elements of this type are used for changing the position, they can be integrated in a control circuit which serves in particular for maximizing the signal amplitude and detects the actual value by means of the vibration sensor, and maximizes the signal amplitude that can be detected by the vibration sensor. The advantage of a control circuit of this type is that automatic signal optimization can be performed. Such a control circuit also allows information on various physical properties of the flowing medium to be obtained, for example if the signal amplitude depends on the Reynolds number.

According to a further measure improving the invention, the evaluation unit may also determine by means of defined axial displacements of the disturbing element or vibration sensor asymmetries in the flow profile of the flowing medium, in order in this way to diagnose incorrect installation conditions of the vortex flowmeter.

Further measures improving the invention are described in more detail below, together with the description of a preferred exemplary embodiment, on the basis of the single FIGURE. The FIGURE shows a vortex flowmeter with means for changing components in a signal-optimizing manner.

According to the FIGURE, a closed measuring tube 1 is flowed through by a flowable medium 2. Arranged inside the measuring tube 1 is a disturbing element 3, which is exposed to the flow of the flowable medium 2, so that vortices form downstream in the flowable medium 2. The frequency of the vortices formed in this way is detected by a vibration sensor 4 arranged downstream in the direction of flow. The vortex frequency is dependent in particular on the viscosity and Reynolds number of the flowable medium 2 and on the flow rate. The vortex frequency detected by the vibration sensor is passed to the input side of a downstream electronic evaluation unit 5, which generates from it an electric signal 6 corresponding to the quantitative or volumetric flow on the basis of known mathematical relationships.

The relative position between the measuring tube 1 and the disturbing element 3 and also the relative position between the measuring tube 1 and the vibration sensor 4 can be changed in the case of this exemplary embodiment in an axial direction, i.e. in the direction of flow of the flowable medium 2, in order to optimize the electric signal, that is to say ensure a maximum amplitude. The maximum amplitude is—as explained above—dependent on the fluid-mechanical conditions of the flowable medium.

The disturbing element 3 and the vibration sensor 4 are coupled by respectively assigned push rods 7a and 7b to an adjusting element 8. Here, the adjusting element 8 comprises two electric linear drives, which are combined to form one structural unit and are each assigned to a push rod 7a and 7b, respectively, in order to change the position of the disturbing element 3 and vibration sensor 4 in an axial direction. For this purpose, both push rods 7a and 7b are led through a slit-like wall opening 9 in the measuring tube 1, which by sealing measures known per se prevents any escape of the flowable medium 2 from the measuring tube 1 into the atmosphere.

The adjusting element 8 is part of a control circuit for maximizing the signal amplitude, the control unit 10 of which is in connection on the input side with the vibration sensor 4 for actual value detection. The control unit 10 is an integral part of the electronic evaluation unit 5, which may be formed for example as a programmable controller. The maximizing of the signal amplitude, in the sense of changing the relative position between the measuring tube 1 and the disturbing element 3 or the measuring tube 1 and the vibration sensor 4 in a signal-optimizing manner, is performed automatically.

The invention is not restricted to the preferred exemplary embodiment specified above. Rather, modifications of it that make use of the extent of protection of the claims that follow are also conceivable. For example, it is also possible to carry out a signal-optimizing change of the relative position between the measuring tube 1 and the disturbing element 3 or the measuring tube 1 and the vibration sensor 4 in a radial direction. This can be performed by a corresponding up and down movement of the push rods 7a and 7b.

LIST OF DESIGNATIONS 1 measuring tube
2 flowable medium
3 disturbing element
4 vibration sensor
5 electronic evaluation unit
6 electric signal
7 push rod
8 adjusting element
9 wall opening
10 control unit

The invention claimed is:

1. A vortex flowmeter comprising:
   a closed measuring tube, through which a flowable medium that is to be quantitatively measured flows, said medium flowing against a disturbing element that is arranged in said measuring tube,
   a vibration sensor that is arranged downstream in the direction of flow detecting the vortex frequency generated by the disturbing element, and
   an electronic evaluation unit that is disposed downstream of the vibration sensor converting it into an electric signal corresponding to the quantitative flow rate or volumetric flow rate, wherein means for changing the relative position between the measuring tube and the disturbing element and/or the measuring tube and the vibration sensor in a signal-optimizing manner are provided.

2. The vortex flowmeter as claimed in claim 1, wherein the means for changing the relative position in a signal-optimizing manner act in a radial direction and comprise a push rod, which is connected to the disturbing element or the vibration sensor and is led through a corresponding wall opening in the measuring tube in a sealed manner, in order to perform a radial adjustment of the disturbing element or vibration sensor from the outside.

3. The vortex flowmeter as claimed in claim 1, wherein the means for changing the relative position in a signal-optimizing manner act in an axial direction and comprise a push rod, which is connected to the disturbing element or the vibration sensor and is led through the measuring tube by means of a slide coupling in order to perform an axial adjustment of the disturbing element or vibration sensor from the outside.

4. The vortex flowmeter as claimed in claim 1, wherein the signal-optimizing changing of the relative position in an axial direction and/or radial direction is performed by manual actuating elements.

5. The vortex flowmeter as claimed in claim 4, wherein the manual actuating elements are formed in the manner of adjusting screws.

6. The vortex flowmeter as claimed in claim 1, wherein the signal-optimizing changing of the relative position in an axial direction and/or radial direction is performed by adjusting elements that can be moved by auxiliary energy.

7. The vortex flowmeter as claimed in claim 6, wherein the adjusting elements that can be moved by auxiliary energy are formed in the manner of electric linear drives.

8. The vortex flowmeter as claimed in claim 6, wherein the adjusting elements are part of a control circuit for maximizing the signal amplitude, the control unit of which is in connection on the input side with the vibration sensor for actual value detection.

9. The vortex flowmeter as claimed in claim 8, wherein the control unit is an integral part of the electronic evaluation unit.

10. The vortex flowmeter as claimed in claim 1, wherein the evaluation unit determines by defined axial displacements of the disturbing element or vibration sensor asymmetries in the flow profile.

11. The vortex flowmeter as claimed in claim 3, wherein the signal-optimizing changing of the relative position in an axial direction and/or radial direction is performed by manual actuating elements.

12. The vortex flowmeter as claimed in claim 3, wherein the signal-optimizing changing of the relative position in an axial direction and/or radial direction is performed by adjusting elements that can be moved by auxiliary energy.

13. The vortex flowmeter as claimed in claim 3, wherein the evaluation unit determines by defined axial displacements of the disturbing element or vibration sensor asymmetries in the flow profile.

14. A vortex flowmeter comprising:
    a closed measuring tube for a medium to flow against a disturbing element that is arranged in said measuring tube;
    a vibration sensor to detect a vortex frequency;
    an electronic evaluation unit to receive from the vibration sensor an electric signal corresponding to a quantitative flow rate or volumetric flow rate; and
    means for changing a relative position of at least one of the measuring tube, the disturbing element and the vibration sensor.

* * * * *